INVENTORS
VIRGIL V. STANCIU
BY JACK R. PESHEK

ATTORNEYS

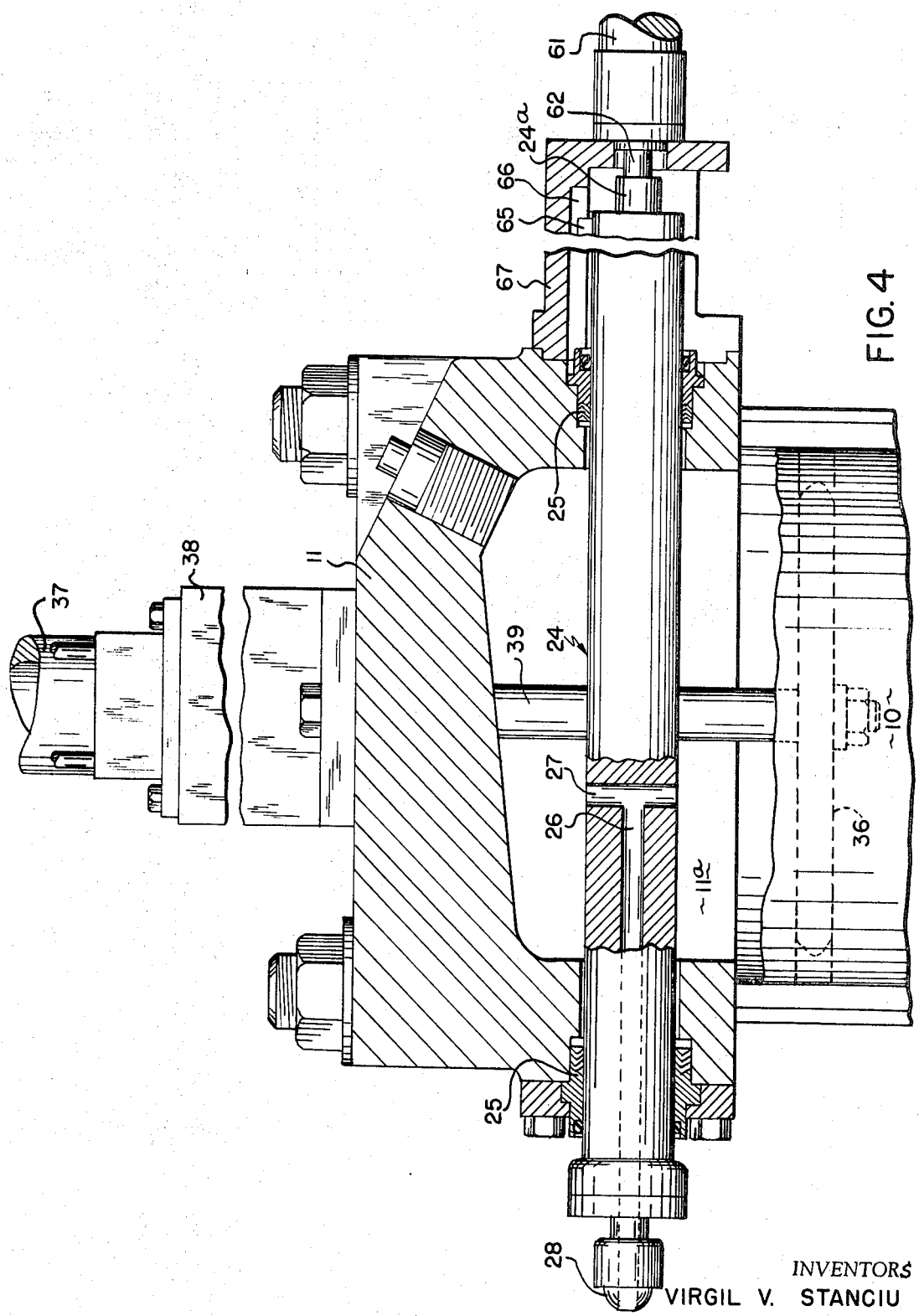

INVENTORS
VIRGIL V. STANCIU
BY JACK R. PESHEK

Baldwin, Doran & Egan
ATTORNEYS

Oct. 27, 1970  V. V. STANCIU ET AL  3,535,743
WAX INJECTION APPARATUS
Filed Nov. 15, 1967  6 Sheets-Sheet 6

INVENTOR.
VIRGIL V. STANCIU
BY JACK R. PESHEK
Baldwin, Doran & Egan
ATTORNEYS

United States Patent Office 3,535,743
Patented Oct. 27, 1970

3,535,743
WAX INJECTION APPARATUS
Virgil V. Stanciu, Rocky River, and Jack R. Peshek, Avon Lake, Ohio, assignors to Tempcraft Tool & Mold, Inc., Cleveland, Ohio, a corporation of Ohio
Filed Nov. 15, 1967, Ser. No. 683,210
Int. Cl. B29f 1/00
U.S. Cl. 18—30                                                                 12 Claims

ABSTRACT OF THE DISCLOSURE

Hot wax for injection of a die or mold is stored in a reservoir and is urged upwardly by a floating piston below the wax and pressed upwardly by hydraulic fluid beneath the piston. The wax moves from the upper part of the reservoir to a die through a nozzle structure having a passageway opening directly to the hot wax. The nozzle passageway communicates with a nozzle tip reciprocatably mounted in the nozzle structure and normally urged by a spring to a forward closed position. A hydraulic jack may move the entire nozzle structure forward to engage the nozzle tip in the gate of a die and to cause the tip to move to a rearward position where it is open to wax flow through said passageway from the reservoir. A novel agitator is reciprocatable up and down through the hot wax in the reservoir by means of a double acting hydraulic jack which is reversed at the upper end of its stroke by a fixed trip and at the lower end of its stroke by a rod extending upwardly from the floating piston, so that the agitator is prevented from striking the piston. Power means is provided to raise or lower the nozzle and reservoir assembly to position the nozzle tip with respect to a given die gate.

---

In injecting hot wax into a die or mold, problems arise when the amount of wax to be injected is greater than that which can be handled by a single stroke of an injection mechanism. An object of the present invention, therefore, is to provide a large volume of hot wax in a reservoir and means to get this wax through a nozzle into the die in large quantities when required.

A preferred embodiment of this invention is described in the specification with reference to the drawings and the essential features will be set forth in the appended claims.

In the drawings,

FIG. 4 is a sectional view, enlarged, taken along the line 4—4 of FIG. 2 showing the upper end of the hot wax reservoir and the nozzle apparatus supported in a head member which is affixed to the top of the reservoir;

Figure 2:
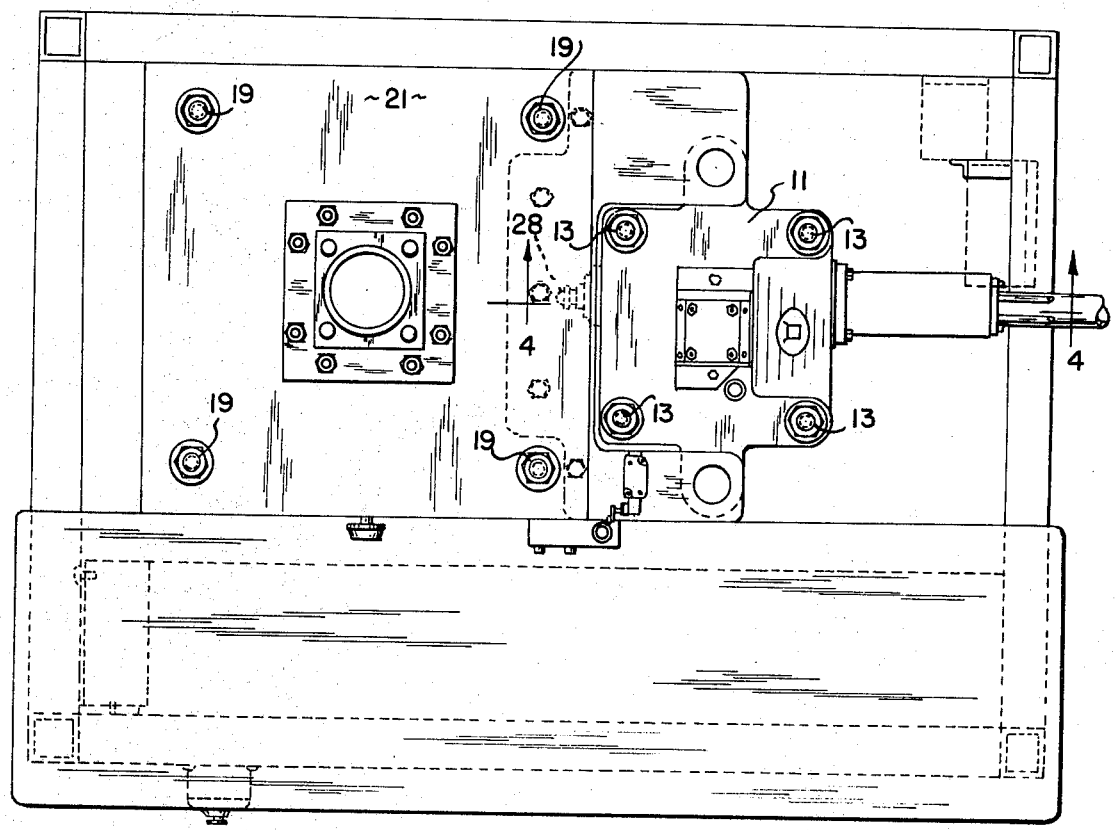
FIG. 2 is a top plan view of the apparatus of FIG. 1.
Figure 3:
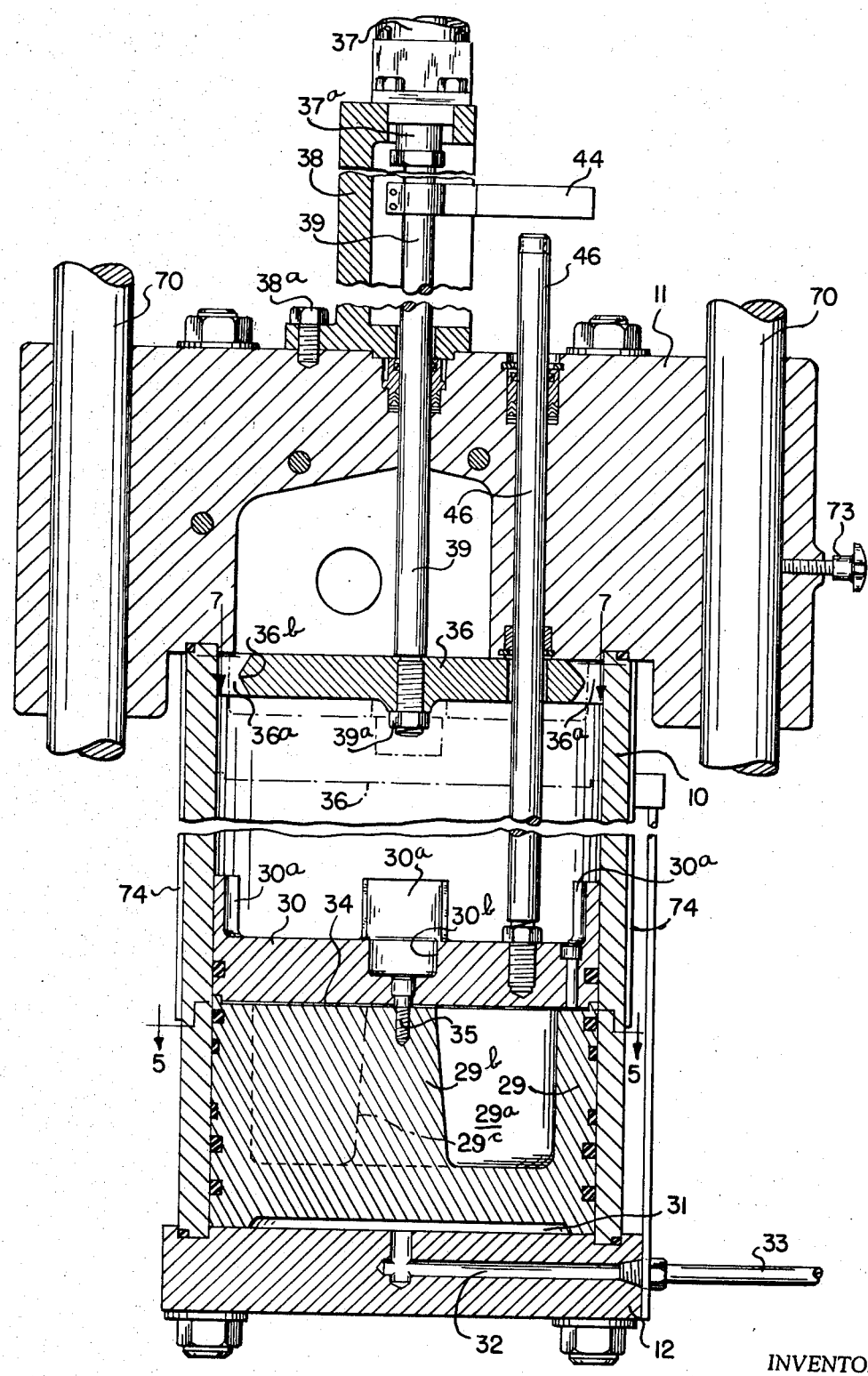
FIG. 3 is a sectional view taken along the line 3—3 of FIG. 1 with the nozzle apparatus removed to more clearly understand the invention.
Figure 7:
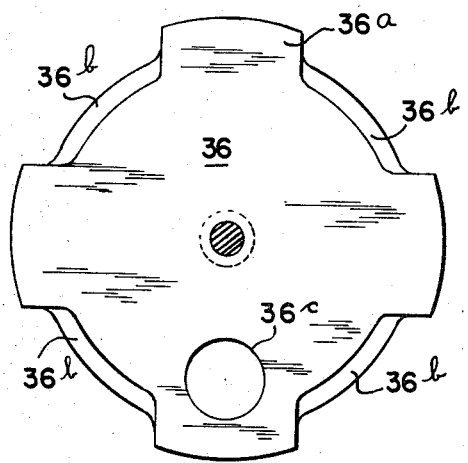
Figure 8:
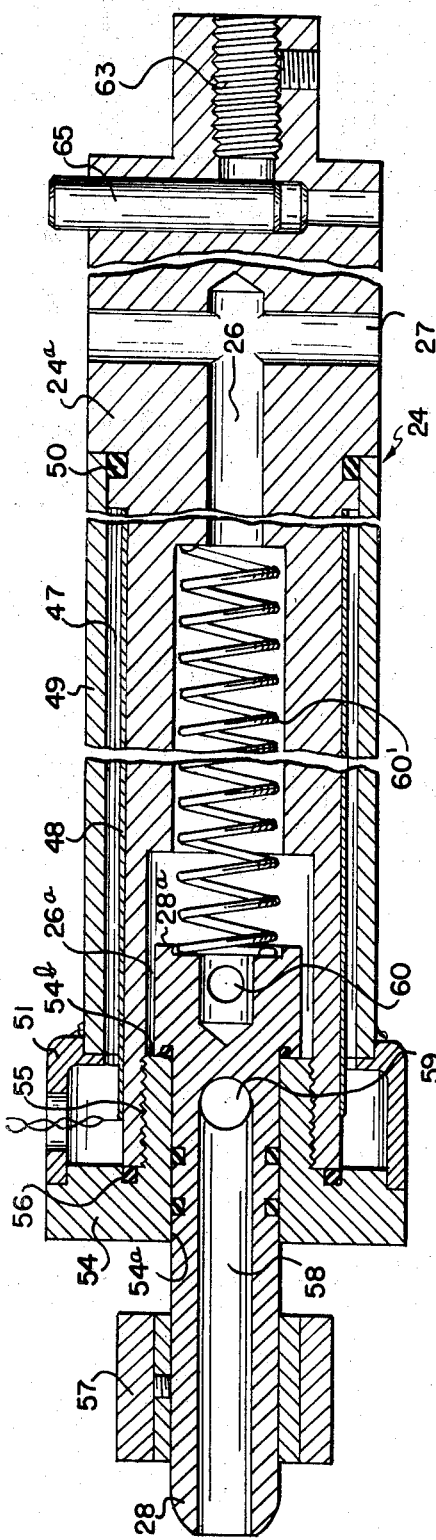
Figure 9:
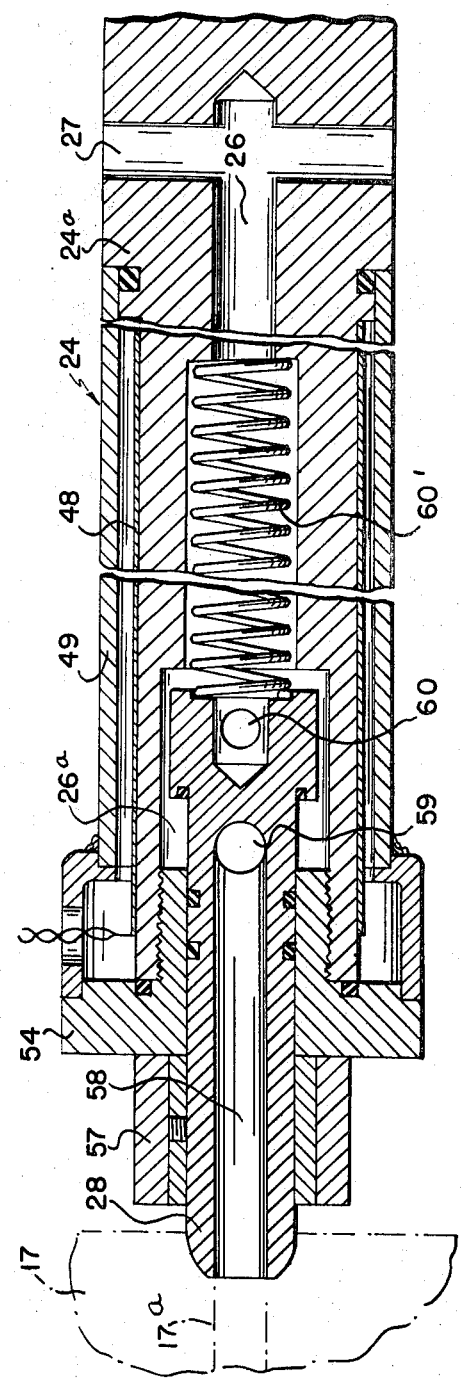

FIG. 7 is a plan view of the top of the agitator taken along the line 7—7 of FIG. 3; while FIGS. 8 and 9 are central sectional views, enlarged, taken generally along the line 4—4 of FIG. 2 but showing essentially the structure of the nozzle apparatus only.

Figure 1:
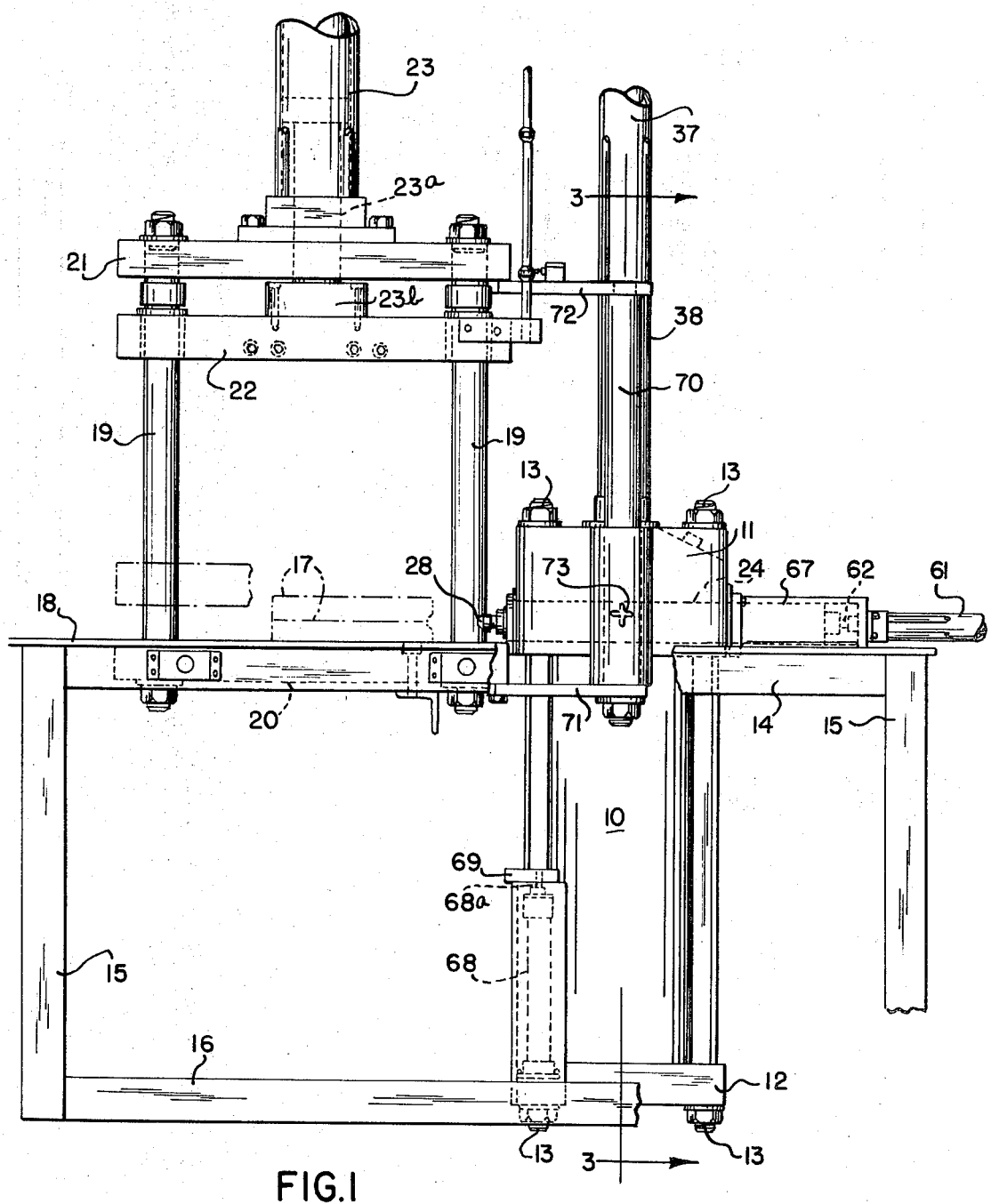
FIG. 1 is an elevational view showing the wax injection apparatus of this invention adjacent to a table upon which is supported a die or mold held in position by the usual platens during an injection operation.

In FIGS. 1 and 2 there is shown a hot wax reservoir 10 having an upper head end 11 and a bottom end cap 12 assembled to the generally cylindrical reservoir tank by means of four bolts located in a generally square pattern around the reservoir tank and holding the head and bottom members in sealed relationship to the cylindrical tank 10. This assembly is supported on a stand having top supporting members 14 and legs 15, braced at the bottom by members 16. On this stand is supplied means for supporting a die or mold to be injected with hot wax. The dies 17 rest on a table top 18 which is secured to the stand. Four corner posts 19 are firmly secured by suitable nuts between lower platen 20, which is fixed, and the upper platform member 21. An upper, movable platen 22 is reciprocatably mounted on the posts 19. A double acting hydraulic cylinder and piston mechanism 23 is rigidly secured to the top platform 21 and has its piston rod 23a extending downwardly and rigidly secured at 23b to the upper platen 22. Means, not shown, is provided to control the flow of hydraulic fluid to the upper or lower end of the jack 23 to raise or lower the upper platen to clamp the dies 17 during injection or to release the dies after injection is completed.

As clearly seen in FIG. 4, nozzle apparatus 24 is mounted for slight reciprocation in the head member 11 by means of suitable sealed bearing members 25. The nozzle structure comprises a longitudinal passageway 26 communicating with a cross passageway 27 which permits flow of hot wax through the nozzle tip 28 when the same is moved toward the right as viewed in FIG. 4, as will later be described. The point here is that the passageways 26 and 27 of the nozzle apparatus are directly in communication with the hot wax in the hollow 11a of the head member 11 which directly communicates with the hot wax in the upper portion of the reservoir 10. Means is provided to place the hot wax in reservoir 10 under pressure so that the same may flow when desired directly through the nozzle tip 28 to the die 17, when desired. The means here shown for this purpose is clearly seen in FIG. 3. A cylindrical floating piston 29 is reciprocatable vertically in the reservoir 10 and is suitably sealed against the inner walls of the reservoir. A piston cap 30 is bolted to piston 29 by bolts which are not shown for clearness of drawings. The piston 29 is at all times during an injection operation urged upwardly by hydraulic fluid in chamber 31 directly beneath the piston 29. This is introduced through passageway 32 and pipe 33 leading a hydraulic pump which is not shown. Note that fully enclosed reservoir 10 and the associated chamber 11a of head member 11 are maintained airless because the wax is ejected by applying pressure to the hot wax from the bottom through floating piston 29.

Figure 5:
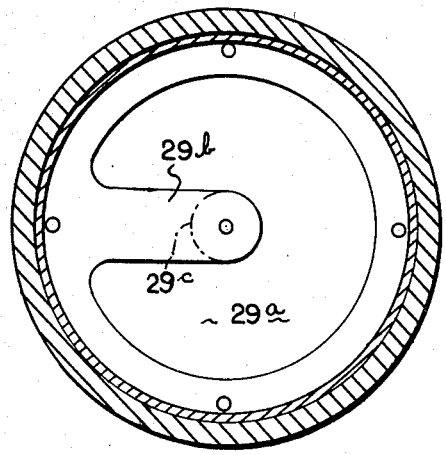
FIG. 5 is a sectional view taken along the line 5—5 of FIG. 3 and showing a top plane view of a floating piston.

To prevent the heat from the hot wax in reservoir 10 being transmitted to the hydraulic fluid in chamber 31, an asbestos gasket 34 is provided between the cap 30 and the piston 29. Furthermore, as clearly seen in FIG. 5, air insulation is provided in chamber 29a between cap 30 and the bottom wall of piston 29 save for a radial projection 29b which extends to the center of piston 29 to receive a bolt 35 which secures the cap 30 to the piston 29. If desired, the projection 29b may be cut away to the dot-dash line 29c leaving only a center post to receive the bolt 35.

Means is provided for keeping the hot wax in reservoir 10 in constant circulation so that it will be at an even temperature for injection when desired. This means is here shown as a generally flat agitator 36 in FIGS. 3 and 7. As clearly seen in plan view in FIG. 7, the agitator has four radially outward portions 36a which fit snugly but slidably against the inner cylindrical walls of reservoir 10. Spaced cut away portions 36b are provided about the periphery only, there being four of these portions shown each extending approximately 50 degrees around the periphery of the agitator. The outwardly extending edges of the cut away portions are beveled as clearly shown in FIG. 3. In the embodiment shown, the apex of the cut away portion is about ⅞ of an inch from the wall of the reservoir which is approximately 12 inches in diameter. For other diameters, the cut away portions represent about eleven percent of the total agitator circle.

Figure 6:
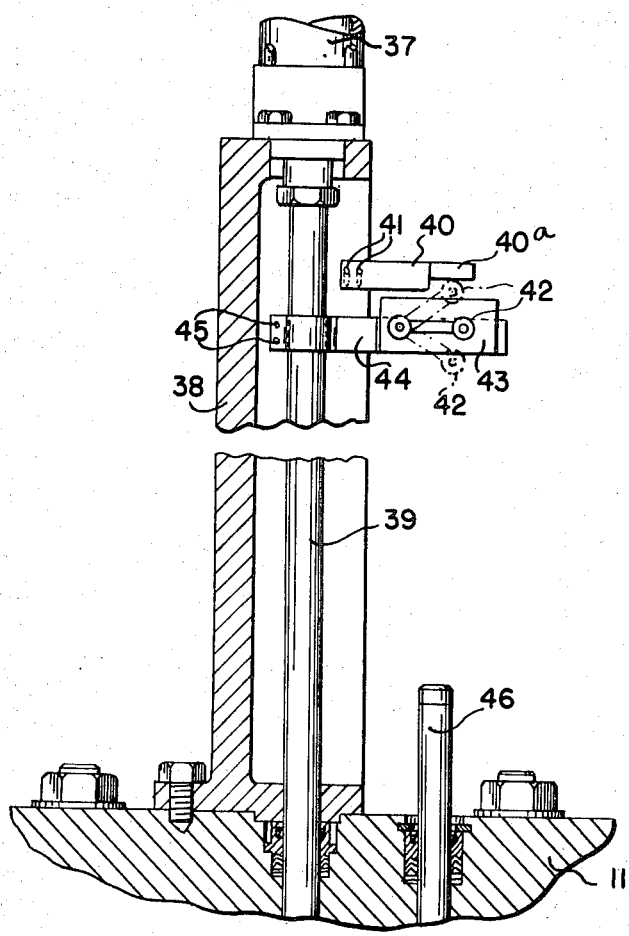
FIG. 6 is an extended view of apparatus connected in the middle upper portion of FIG. 3 showing means for limiting the vertical stroke of the agitator at opposite ends of its travel.

Means is provided for reciprocating the agitator slowly upwardly and downwardly during the major portion of the period when the apparatus is in use, as will be later described. The means here shown for this purpose comprises a double acting hydraulic jack 37 rigidly secured to the upper end of a spacer casting 38, the lower end of which is securely attached to the head member 11 as at 38a. The spacer casting insures that the oil wetted rod 37a will never enter the wax reservoir, nor will wax be carried into jack 37. The jack has a piston rod 37a which is firmly secured to a connecting rod 39 which extends from the jack downwardly to agitator 36 into which the rod is threadedly connected as clearly seen in FIG. 3. Means is provided to change the direction of flow from a suitable pressure fluid supply to the upper and lower ends of hydraulic jack 37 so as to automatically reverse the same at opposite ends of its stroke. Referring to FIG. 6, at the upper end of its stroke the direction of flow to hydraulic jack 37 is reversed by means of a fixed but adjustable trip 40 which is secured to the spacer casting 38 by bolts 41 passing through suitable vertical slots in the trip to provide for its adjustment. This trip has a laterally extending arm 40a which overlies the actuator 42 of an electrical switch 43 which is carried by a bracket 44 having a split end which is clamped against the agitator connecting rod 39 by means of bolts 45. The action of switch 43 is such that upon the actuator 42 striking the trip 40, the actuator is moved to the lower broken line position of FIG. 6 from the full line position and this causes electrical actuation of a valve which reverses the flow to provide pressure at the upper end of jack 37 to start the downward stroke of the agitator. At the lower end of its stroke, the actuator 42 strikes a rod 46 which is rigidly attached to the piston cap 30 so that the position of rod 46 always indicates the position of the floating piston. This rod 46 passes through the agitator by way of a through opening 36c clearly seen in FIG. 7. When the actuator strikes the top of rod 46, the actuator is moved from the full line position of FIG. 6 to the upper broken line position, thus causing an electrically actuated valve to switch the flow to hydraulic jack 37 to cause pressure at the lower end thereof. Thus, the agitator is steadily reciprocated without any possibility of it striking the piston cap 30. Referring to FIG. 3, it will be seen that the piston cap has upwardly extending projections 30a which are vertically in line with the cut away portions 36b of the agitator and enter upwardly into those cut away portions in the uppermost position of the agitator as shown in dot-dash lines in FIG. 3. At the upper end of the stroke of piston 30, these projections prevent the trapping of agitator 36 between that piston and the head 11. The recess 30b in piston cap 30 is to accommodate the nut 39a at the lower end of the agitator connecting rod and any extending portion of the rod at that point when the agitator is in its uppermost position.

The nozzle structure 24 will now be more thoroughly described. Referring to FIGS. 8 and 9, a long cylindrical housing 24a is provided with a longitudinal passageway 26 and the cross passageway 27 communicating therewith as previously described. The housing has an annular portion 47 cut away from the major portion of the housing between cross passageway 27 and the front end of the nozzle structure. An electric heater 48 is provided around the housing at this point surrounded by a cylindrical jacket 49 which is sealed to the housing by O-ring 50. The front end of the nozzle jacket is closed by a nozzle cap 51 which is brazed to the front end of the jacket 49. A nozzle nut 52 closes the front end of the housing and is threaded into the housing at 55. A seal is provided at 56 to prevent fluid leaking into the electrically heated chamber. The nozzle 28 is snugly reciprocatable in a bore 54a extending longitudinally of the nut 54. Suitable O-ring seals are provided between the nozzle tip and this bore. The inner end of the nozzle tip is of enlarged diameter at 28a and, in the forwardmost position of the nozzle tip, this portion 28a seats against a shoulder 54b of the nut 54 and is sealed there by means of an O-ring. A collar 57 is secured on the nozzle tip which is provided with electric heating to keep the nozzle tip hot. Centrally of the nozzle tip is a longitudinally extending passageway 58 which communicates with a diametrically extending cross passageway 59. The position of this cross passageway is such that in the position of the parts in FIG. 8 it is closed against hot wax, but in the rearward position of the nozzle tip as seen in FIG. 9, this cross passageway 59 is open to flow of hot wax from the passageway 26a which is a forward extension of the passageway 26 previously mentioned. A helical spring 60' normally holds the nozzle tip 28 in its forward position as shown in FIG. 8. A diametrically extending passageway in the nozzle tip portion 28a is shown at 60 which at all times provides communication between passageway 26 and the forward extension thereof 26a.

Means is provided for reciprocating the nozzle structure 24 endwise in the bearing members 25 in head member 11. This could be done manually but in this case there is provided a double acting hydraulic jack 61 for this purpose. This jack has a piston rod 62 which has a threaded connection at 63 with the right-hand end of the housing 24a as clearly shown in FIGS. 4 and 8. A pin 65 projects upwardly out of the housing 24a at the right-hand end thereof as seen in FIGS. 4 and 8 and is received in a keyway 66 in a casting 67 which serves as a spacer for the hydraulic jack 61. This spacer 67 is rigidly secured to the head member 11 and the hydraulic jack is in turn rigidly fixed to the outer end of the spacer member. This insures that the oil-wetted piston rod of the jack does not enter the wax inside head 11. Means, not shown, is provided to provide pressure fluid at either end of jack 61 as desired to reciprocate the nozzle structure.

It should be obvious from the above description that the nozzle structure is normally in the position of FIG. 8 and no flow is permitted of the hot wax through passageways 26 and 27. However, when the die 17 is in the position shown in dot-dash lines in FIG. 9, then the jack 61 may be operated to move the nozzle structure bodily toward the left as viewed in FIGS. 1 and 4 causing the nozzle tip 28 to seat itself in the gate 17a of the die and continued movement of the housing 24a toward the left as viewed in FIGS. 8 and 9 will take up the gap between part 28a and shoulder 54b so that the parts reach the position of FIG. 9. At this point, flow of the hot wax is directly from reservoir 10 and hollow chamber 11a in the head member 11 through passageways 27, 26, 60, 26a, 59 and 58 to and through the nozzle tip into the die which is to be injected. At the end of the injection operation the nozzle structure 24 is moved toward the right in FIGS. 1 and 4 which terminates the injection action.

Preferably, means is provided for controlling the vertical height of the reservoir and nozzle assembly including the reservoir tank 10, its bottom cap 12 and its head member 11 which carries the nozzle structure 24. This comprises two hydraulic jacks 68, one of which is seen in FIG. 1. The other is diagonally opposite the one shown. This jacket is fixed to the lower cap 12 and has piston rod 68a connected to a bracket 69 which is rigidly connected to the reservoir structure. Means not shown is provided to introduce pressure fluid to the two jacks 68 in parallel whenever it is desired to raise the reservoir and nozzle assembly to suitably position the nozzle tip 28 relative to a die 17 about to be injected. This vertical movement of this assembly is guided by two vertical posts 70 clearly seen in FIGS. 1 and 3, each of these posts is rigidly bolted to a lower plate 71 which is fixed to the lower platen 20 and captured in a suitable opening in an upper plate 72 which is fixed to the upper platform 21. The head member 11 is slidable upon the posts 70 when propelled by the jacks 68 and any desired position of the reservoir and nozzle assembly on the vertical posts 70 is held fixed by knob 73 threaded into the head member 11.

The control of the hydraulic pressure fluid to chamber 31 through line 33 forms no part of the present invention. However, there is a slight problem in maintaining constant pressure on the hot wax in the reservoir 10 due to the displacement of hot wax as the agitator rod 39 moves deeper downwardly into the reservoir. For this reason, when the agitator 36 starts downward, a hydraulic valve, not shown, supplying line 33 closes. When the agitator starts up, then the hydraulic valve opens again. This is true when there is no injection going on. Usually, the injection is controlled by a timer and when this timer starts, coincident with moving the nozzle tip 28 up to the die, control circuits, not shown, are provided to stop the agitator and to open the hydraulic valve supplying line 33. When the injection timer stops the injection, then the hydraulic valve is closed and returns to the automatic control on up and down strokes as indicated hereinabove. By control circuits, not shown, the machine can be caused to start periodically during idle time to caues agitation of the wax in the reservoir.

Means is provided to keep the hot wax in a hot or liquid condition at all points in the system. For instance, flexible silicon rubber heaters 74 are provided completely surrounding the reservoir tank 10 from the floating piston upwardly. Other heater members are provided in positions not shown on the agitator connecting rod 39 and on the various piston rods which are exposed to hot wax.

The operation of this invention should now be apparent. The die 17 to be injected is placed on the lower platen 20 in proper position and the upper platen 22 is pressed tightly downward upon it by the hydraulic jack 23. Jack 61 is then actuated to move the nozzle tip 28 into contact with the gate 17a of the die 17, thus causing the nozzle tip to move from the position of FIG. 8 to FIG. 9 and to start an injection. At the end of the injection period, the hydraulic jack 61 operated to move the nozzle structure 24 toward the right in FIGS. 1 and 4, thus permitting spring 60' to return the nozzle tip to the shut-off position of FIG. 8.

When the injection system is desired to be filled, obviously the injection piston will have to be moved downward. This is accomplished by over-riding the limit switch 43 so that a reversing action is not effected when arm 42 comes in contact with the guide rod 46 of the piston. The resulting action is that the agitator 36 contacts the head cap 30 of the piston 29 and moves the piston 29 downward.

After the injection unit 10, 11, is filled with melted wax, any residual air in the injection cylinder can be displaced by over-riding the upward actuation of limit switch 43 when it contacts trip 40a—causing the injection piston 29 to exert upward pressure on the wax and to displace any air in the chamber of head 11. Thereafter no air can contaminate the hot wax as pressure is applied to the wax from the bottom through floating piston 29.

The action of agitator 36 and injection piston 29 are interconnected by controls not shown so that when the agitator moves up, oil pressure is supplied to line 33 forcing the piston up. When the agitator moves downward, oil pressure to line 33 is released to a sump tank at atmospheric pressure to allow the displacement of wax caused by the connecting rod 39 to be compensated for by slightly moving the injection piston 29 downward.

The herein described embodiment of the invention refers to "wax" as the material which is handled. This terms in both the description and claims is intended to cover similar hot melted materials adapted for injection into a die for solidification there.

What is claimed is:

1. Wax injection apparatus comprising a closed reservoir of hot wax, means for filling said reservoir with hot wax free of air, means for continuously mechanically agitating said wax in said reservoir whereby no air is introduced, a wax injection nozzle means having a wax passageway having a discharge end and an inlet passage in communication therewith, said inlet passage communicating directly with the hot wax in said reservoir, means for opening and closing said wax passageway, and means for applying air-free pressure to all of said hot wax in said reservoir, whereby hot wax will flow out said nozzle means discharge end whenever said wax passageway is opening solely due to the pressure maintained in said reservoir.

2. Apparatus as defined in claim 1, wherein said reservoir is closed at the top by a hollow-head sealed to said reservoir, said nozzle means extending through the hollow of said head, said nozzle means having at said discharge end a nozzle extending outwardly beyond said head in position to engage the gate of a die to the injected, and said inlet passage communicating with the hollow of said head.

3. Apparatus as defined in claim 2, wherein said nozzle is reciprocatingly mounted in said nozzle means for movement between an outward position where said nozzle is closed and an inward position where said nozzle is open, means yieldingly urging said nozzle toward said outward position, said nozzle means slidably mounted and sealed in the walls of said head for movement of said nozzle means endwise, means for so moving said nozzle means endwise to engage said nozzle against the gate of a fixed die, whereby said engagement will cause said nozzle to move from its outward to its inward position to thereby inject said die.

4. Apparatus as defined in claim 2, wherein said means for applying pressure to said hot wax comprises a piston reciprocatable in the lower part of said reservoir and sealed against the inner walls of said reservoir, and means for raising said piston to urge said hot wax upwardly.

5. Apparatus as defined in claim 4, said last named means including means for continuously introducing a pressure fluid to exert pressure beneath said piston as hot wax leaves the reservoir.

6. Apparatus as defined in claim 5, wherein said piston provides heat insulation between said hot wax and said pressure fluid.

7. Apparatus as defined in claim 1 wherein said agitating means includes a wax agitator reciprocatably mounted in said reservoir, said agitator being generally planar and extending substantially uninterruptedly between the walls of said reservoir save for there being provided spaced openings extending through said agitator from top to bottom thereof and adjacent the periphery thereof only, and power means for continuously reciprocating said agitator.

8. Apparatus as defined in claim 4, including a wax agitator reciprocatably mounted in said reservoir, a double acting cylinder and piston device fixedly mounted near said reservoir and having a piston rod connected to said agitator, a pressure fluid supply for said device, and means for reversing the supply of pressure fluid alternately between opposite ends of said device including an upper trip and a lower trip responsive to the position of said wax pressure piston.

9. Apparatus as defined in claim 1, including means for moving said reservoir and nozzle means to position the latter for cooperation with a die to be injected with hot wax.

10. The combination of claim 1, wherein said nozzle means includes an elongated housing, a nozzle head closing the front end of said housing, there being a bore through said head extending longitudinally of said housing, a nozzle tip reciprocatably mounted in said bore and extending rearwardly thereof, means limiting forward and rearward movement of said nozzle tip in said head, there being a longitudinally extending passageway in said nozzle tip from the front end thereof to a point short of the rear end thereof, there being a cross passageway at said point communicating with said longitudinally extending passageway, said cross passageway opening laterally outwardly of said nozzle tip at an inlet opening, said inlet opening being clear of said head in the rearmost position of said nozzle tip, there being a passageway for supply of said medium from said inlet opening in the rearmost position of said tip to a zone spaced rearwardly therefrom, said supply passageway opening outwardly through said housing at said zone, and resilient means in said housing urging said nozzle tip to its forwardmost position.

11. Apparatus as defined in claim 8, including a rigid spacer fixed between the cylinder of said cylinder and piston device and said reservoir and of a length to insure that the portion of said piston rod exposed in said cylinder is never extended into said reservoir.

12. Apparatus as defined in claim 3, wherein said means for moving said nozzle means endwise comprises a cylinder and piston device having a piston rod connected to said nozzle means, and a rigid spacer fixed between the cylinder of said cylinder and piston device and said head and of a length to insure that the portion of said piston rod exposed in said cylinder is never extended into said head.

References Cited
UNITED STATES PATENTS

| | | | |
|---|---|---|---|
| 2,422,990 | 6/1947 | Spanier | 18—30 |
| 2,831,606 | 4/1958 | Alters | 222—246 XR |
| 2,986,776 | 6/1961 | Frohring | 18—30 |
| 3,095,609 | 7/1963 | Lievre | 18—30 |
| 3,401,426 | 9/1968 | Evans | 18—30 |

H. A. KILBY, JR., Primary Examiner

U.S. Cl. X.R.

264—166